United States Patent
Viens

(10) Patent No.: US 7,469,929 B2
(45) Date of Patent: Dec. 30, 2008

(54) BIDIRECTIONALLY AND ANGULARLY ADJUSTABLE FENDER ATTACHING DEVICE

(75) Inventor: Réjean Viens, Granby (CA)

(73) Assignee: Produits Metchro Inc., St.-Hyacinthe, Quebec (CA)

( * ) Notice: Subject to any disclaimer, the term of this patent is extended or adjusted under 35 U.S.C. 154(b) by 95 days.

(21) Appl. No.: 11/396,273

(22) Filed: Mar. 31, 2006

(65) Prior Publication Data

US 2007/0228718 A1    Oct. 4, 2007

(51) Int. Cl.
   *B62D 25/18*    (2006.01)
   *B60R 19/00*    (2006.01)

(52) U.S. Cl. .................. 280/847; 280/848; 280/154; 280/849; 280/851; 280/854; 296/198

(58) Field of Classification Search ............... 280/847, 280/848, 154, 849, 851, 854; 296/198
   See application file for complete search history.

(56) References Cited

U.S. PATENT DOCUMENTS

| | | | | |
|---|---|---|---|---|
| 1,094,134 A | * | 4/1914 | Dickerson | 280/154 |
| 2,450,958 A | * | 10/1948 | Hayes | 280/154 |
| 3,613,972 A | | 10/1971 | Daughhette | 224/42.24 |
| 4,377,294 A | * | 3/1983 | Lockwood et al. | 280/851 |
| 4,591,178 A | * | 5/1986 | Mortvedt et al. | 280/154 |
| 4,740,003 A | * | 4/1988 | Antekeier | 280/848 |
| 5,794,956 A | | 8/1998 | Hurlburt et al. | 280/156 |
| 5,879,045 A | | 3/1999 | Logan | 296/136 |
| 5,950,975 A | * | 9/1999 | Zieske | 248/291.1 |
| 5,993,133 A | | 11/1999 | Murray et al. | 414/463 |
| 6,007,102 A | * | 12/1999 | Helmus | 280/849 |
| 6,893,048 B2 | | 5/2005 | Rush et al. | 280/854 |
| 6,923,351 B2 | | 8/2005 | Roehmer et al. | 224/42.21 |
| 2002/0020983 A1 | * | 2/2002 | Hawes | 280/154 |
| 2002/0024213 A1 | * | 2/2002 | Hawes | 280/854 |
| 2004/0222261 A1 | | 11/2004 | Wilson | 224/509 |
| 2005/0140178 A1 | | 6/2005 | Kennedy et al. | 296/198 |
| 2005/0167972 A1 | * | 8/2005 | Hawes | 280/854 |
| 2005/0179245 A1 | * | 8/2005 | Hartmann et al. | 280/847 |

FOREIGN PATENT DOCUMENTS

| | | | |
|---|---|---|---|
| EP | 1449749 | | 8/2004 |
| GB | 2181396 A | * | 4/1987 |

* cited by examiner

*Primary Examiner*—Christopher P Ellis
*Assistant Examiner*—John R Olszewski
(74) *Attorney, Agent, or Firm*—Fulbright & Jaworski, LLP

(57) ABSTRACT

A device for attaching a fender to a vehicle comprises an elongated member and a fender fixation member. The elongated member has a proximal end and a distal portion, and the proximal end is configured to be attached to the vehicle. The fender fixation member is mounted to the distal portion of the elongated member, and the position of this fender fixation member is adjustable relative to the distal portion. The fender fixation member comprises a bracket for fixation to the fender of the vehicle, and a distance adjustment mechanism interposed between the distal portion of the elongated member and the fender fixation member. The bracket is also adjustable relative to a direction parallel to a longitudinal axis of the distal portion of the elongated member.

20 Claims, 5 Drawing Sheets

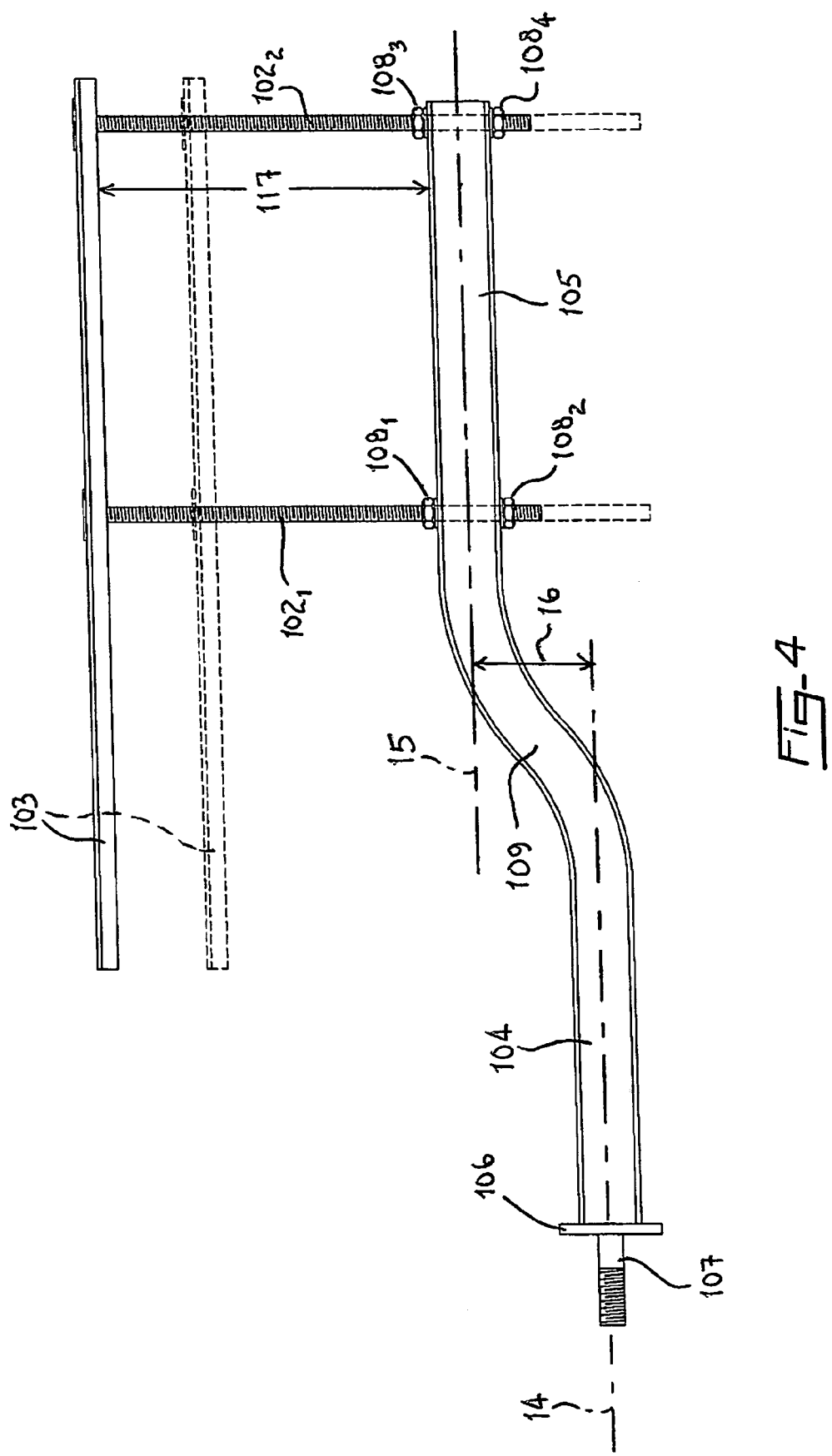

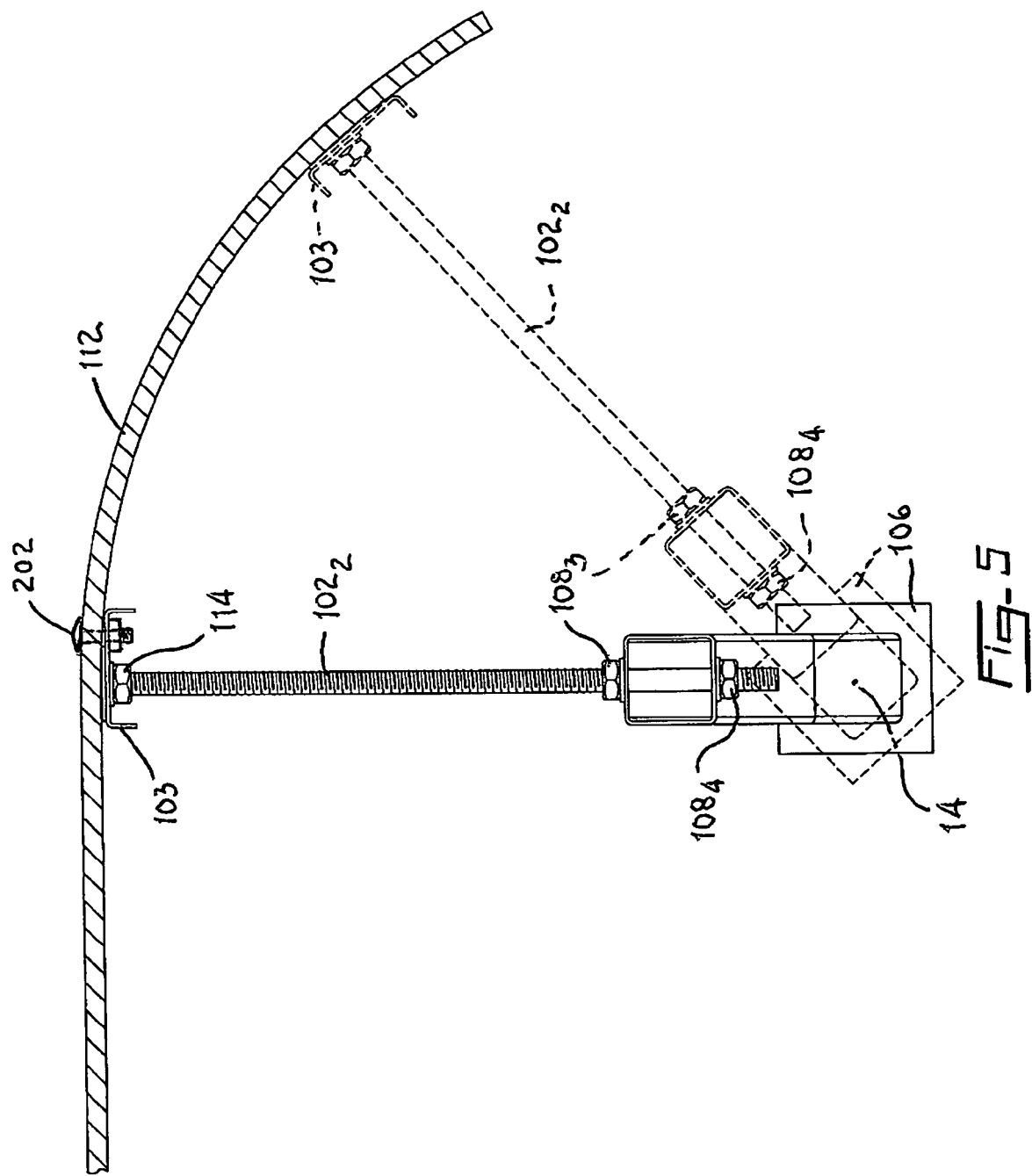

US 7,469,929 B2

BIDIRECTIONALLY AND ANGULARLY ADJUSTABLE FENDER ATTACHING DEVICE

FIELD OF THE INVENTION

The present invention relates generally to a device for attaching a fender to a vehicle. More particularly but not exclusively, the present invention relates to a device for attaching a fender comprising an elongated member on which an adjustable fender fixation member is mounted.

BACKGROUND OF THE INVENTION

Tractor trucks are used to hitch semitrailers, the front part of which being designed to lie on the rear part of the tractor truck. Generally, a tractor truck comprises ten wheels disposed symmetrically on each side of the tractor truck on three axles: one front axle that holds two wheels and two rear axles that hold four wheels each. When the tractor truck is coupled to the semitrailer, the front part of the semitrailer covers the eight rear wheels of the tractor truck. Since rotation of the rear wheels of a tractor truck will propel rocks and/or other road debris toward the underside of a semitrailer coupled to the tractor truck or toward vehicles following the tractor truck when no semitrailer is coupled to this tractor truck, there exists a need to provide fenders that cover the rear wheels of the tractor truck to protect the semitrailer and other vehicles from the propelled rocks/debris.

Various types of devices for attaching a fender to a vehicle have been proposed. However, these fender attaching devices lack adjustability and their installation is both tedious and time-consuming. Therefore, there exists a need for a fender attaching device of improved adjustability that would facilitate both installing the fender attaching device and mounting the fender to the vehicle.

SUMMARY OF THE INVENTION

Therefore, the present invention relates to a device for attaching a fender to a vehicle. This device comprises an elongated member that has a proximal end and a distal portion. The proximal end is configured to be attached to the vehicle. The device also comprises a fender fixation member that is mounted to the distal portion of the elongated member. The position of the fender fixation member is adjustable relative to about the distal portion of the elongated member.

According to one embodiment, the position of the fender fixation member may be adjustable in a direction generally parallel to the distal portion of the elongated member.

According to another embodiment:

the proximal end of the elongated member may comprise a fastener for fixation to the vehicle;

the fastener may be structured to allow the elongated member to rotate about a longitudinal axis at the proximal end of this elongated member in order to allow that elongated member to be fixed to the vehicle and to the fender at various angular positions about the longitudinal axis of the proximal end of the elongated member.

The foregoing and other objects, advantages and features of the present invention will become more apparent upon reading of the following non restrictive description of an illustrative embodiment thereof, given by way of example only with reference to the accompanying drawings.

BRIEF DESCRIPTION OF THE DRAWINGS

In the appended drawings:

FIG. 4 is a side elevational view of the fender attaching device of FIG. 3; and

FIG. 5 is an outer end view of the fender attaching device of FIGS. 3 and 4, showing angular adjustability of the fender attaching device.

DETAILED DESCRIPTION OF THE ILLUSTRATIVE EMBODIMENT

Figure 3:
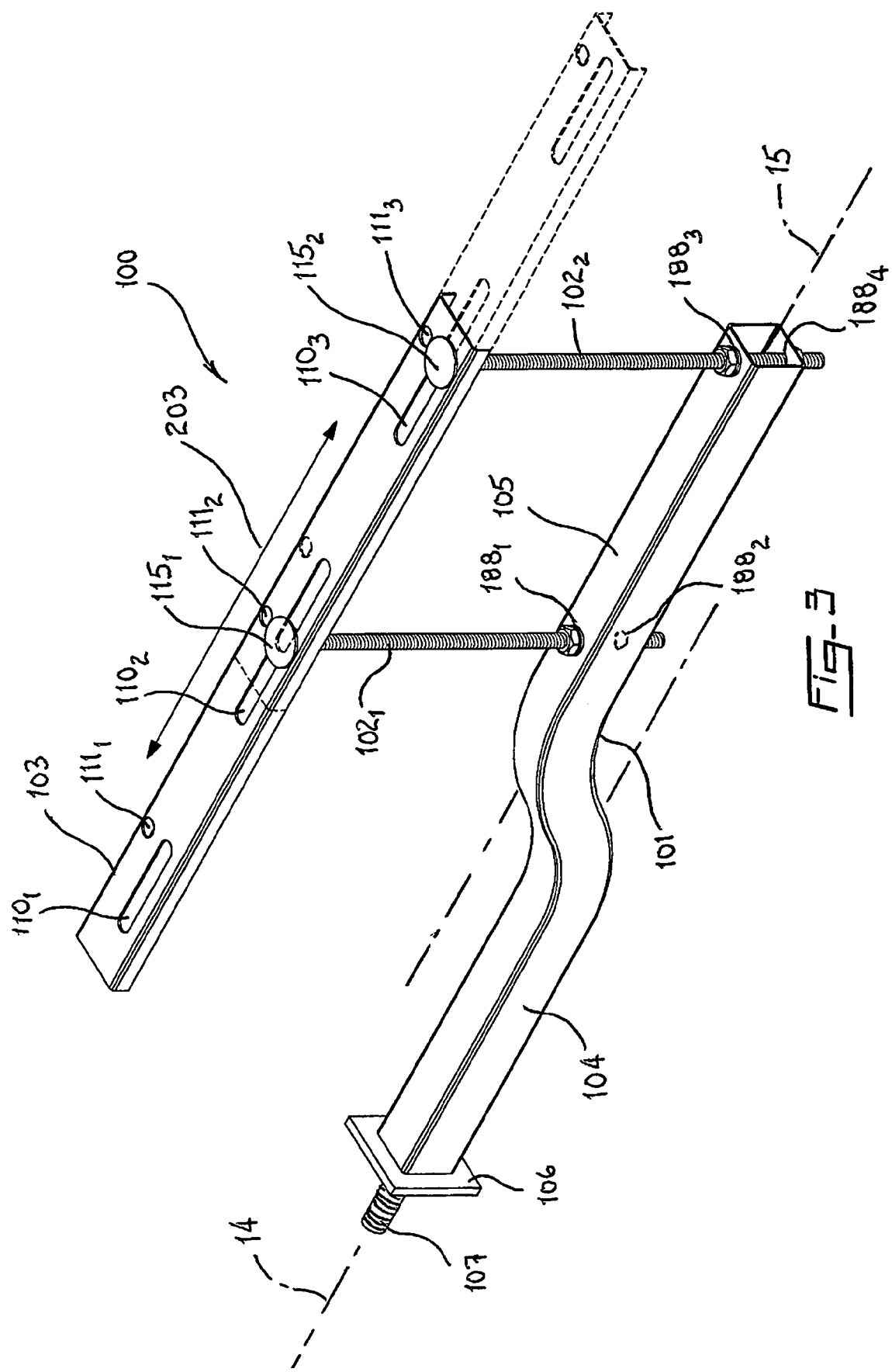
FIG. 3 is a perspective view of a fender attaching device according to the illustrative embodiment of the present invention.

Referring to the appended FIGS. 3, 4 and 5, the non-restrictive illustrative embodiment of the device for attaching a fender to a vehicle is generally identified by the reference 100. As illustrated, the device for attaching a fender to a vehicle 100 comprises three main components: an elongated member 101, two threaded rods $102_1$ and $102_2$, and an elongated bracket 103 with a channel-shaped cross section.

Although other materials could be contemplated, the elongated member 101, threaded rods $102_1$ and $102_2$, and elongated bracket 103 can be made of metal, for example rust-resistant metal.

The elongated member 101 can be made, for example, of a tube having a square cross section. The elongated member 101 comprises a proximal end 104 and a distal portion 105. The proximal end 104 defines a longitudinal axis 14 while the distal portion 105 defines a longitudinal axis 15.

The proximal end 104 comprises a square plate 106 mounted, for example welded, to the proximal end of the square tube generally perpendicular to the longitudinal axis 14. A threaded rod portion 107 has one end mounted, for example welded, to the outer face of the plate 106 coaxial with the longitudinal axis 14.

The distal portion 105 of the elongated member 101 comprises two set of coaxial holes $188_1, 188_2$ and $188_3, 188_4$ in the distal portion 105 of the elongated member 101. Each set of coaxial holes $188_1, 188_2/188_3, 188_4$ are oriented in a generally vertical direction perpendicular to the longitudinal axis 15.

The proximal end 104 and the distal portion 105 are generally parallel to each other and are joined together by a generally central curved portion 109. This curved portion 109 offsets the longitudinal axes 14 and 15 with respect to each other in a generally vertical direction by a distance 16 (FIG. 4).

The elongated, channel shaped bracket 103 comprises a series of three longitudinal and coaxial slots $110_1$, $110_2$ and $110_3$. The elongated, channel-shaped bracket 103 is also provided with a series of three holes holes $111_1$, $111_2$ and $111_3$ for fixation of a vehicle fender to the bracket 103.

The distal end of the threaded rod $102_1$ comprises a flat head $115_1$. The threaded rod $102_1$ is inserted in the slot $110_1$ (or the slot $110_2$) with the head $115_1$ situated on the top face of the elongated bracket 103 in channel-inverted position. To secure the distal end of the threaded rod $102_1$ to the elongated bracket 103, a nut (not shown) is screwed on the threaded rod $102_1$ on the side of the elongated bracket 103 opposite to the head 115, with a washer (not shown) interposed between the nut (not shown) and the elongated bracket 103. The proximal portion of the threaded rod 102, is inserted through the set of coaxial holes $188_1, 188_2$ of the distal portion 105 of the elongated member 101. The proximal portion of the threaded rod 102, is then secured to the distal portion 105 of the elongated member 101 by a pair of nuts $108_1$ and $108_2$ (FIG. 4) situated on opposite sides of the distal portion 105, with a washer interposed between each nut $108_1$ and $108_2$ and the distal portion 105.

In the same manner, the distal end of the threaded rod $102_2$ comprises a flat head $115_2$. The threaded rod $102_2$ is inserted in the slot $110_2$ (or the slot $110_3$) with the head $115_2$ situated on the top face of the elongated bracket 103 in channel-inverted position. To secure the distal end of the threaded rod $102_2$ to the elongated bracket 103, a nut 114 (FIG. 5) is screwed on the threaded rod $102_2$ on the side of the elongated bracket 103 opposite to the head $115_2$ with a washer interposed between the nut 114 and the elongated bracket 103. The proximal portion of the threaded rod $102_2$ is inserted through the set of coaxial holes $188_3, 188_4$ of the distal portion 105 of the elongated member 101. The proximal portion of the threaded rod $102_2$ is then secured to the distal portion 105 of the elongated member 101 by a pair of nuts $108_3$ and $108_4$ (FIG. 4) situated on opposite sides of the distal portion 105, with a washer interposed between each nut $108_3$ and $108_4$ and the distal portion 105.

Installation of the device 100 for attaching a fender to a vehicle will now be described.

Figure 2:
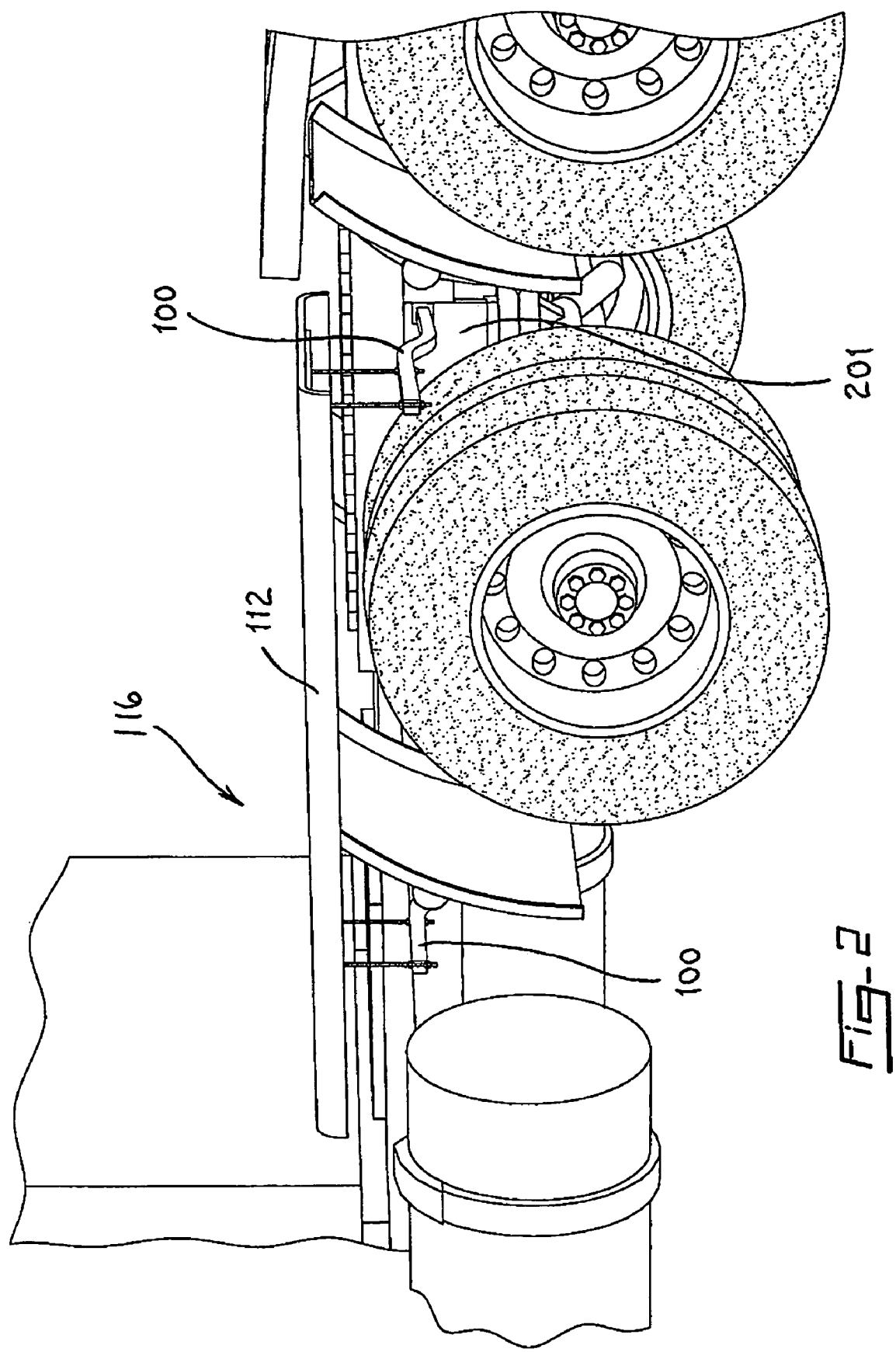
FIG. 2 is an enlarged perspective view of a portion of the tractor truck of FIG. 1 showing details of the fender attaching devices.

As a first step, the proximal end 104 of the elongated member 101 is attached to the vehicle, for example the tractor truck 116 of FIG. 2, by inserting the threaded rod portion 107 through a hole (not shown) of the frame 201 of the tractor truck 116. The proximal end 104 of the elongated member 101 is then attached to frame 201 by screwing a nut-and-washer assembly (not shown) on the free end of the threaded rod portion 107. As illustrated in FIG. 5, the elongated member 101 can then be rotated about the threaded rod portion 107, i.e. about the longitudinal axis 14, at a proper angular position depending on the shape of the fender 112 and desired position for the elongated bracket 103 on the fender 112. As can be seen in FIG. 5, a large range of angular positions about longitudinal axis 14, more specifically over 360°, are possible. Of course, other methods of fixation of the proximal end 104 of the elongated member 101 to the frame 201 can be contemplated.

Then, all the nuts such as $108_1$, $108_2$, $108_3$, $108_4$ and 114 are loosened, including the nut-and-washer assembly screwed on the threaded rod portion 107, to enable full adjustment of the device for attaching a fender to a vehicle 100. Just a word to mention that the two threaded rods $102_1$ and $102_2$ have been preliminarily mounted in two slots amongs slots $110_1$, $110_2$ and $110_3$ appropriate for the intended fender installation.

The elongated bracket 103 is attached to the fender 112 using the three holes $111_1$, $111_2$ and $111_3$ and bolt-and-nut assemblies such as 202 (FIG. 5). Drilling holes through the fender 112 can be required to complete fixation of the elongated bracket 103 to the fender 112 through the bolt-and-nut assemblies such as 202.

The threaded rods $102_1$ and $102_2$ are then slid in the respective slots $110_1$, $110_2$ or $110_2, 110_3$ until the required longitudinal positional adjustment of the elongated bracket (see arrows 203) in a direction parallel to the longitudinal axis 15 is reached. The nuts such as 114 (FIG. 5) are then tightened to fixedly secure the distal end of the rods $102_1$ and $102_2$ in this position on the elongated bracket 103.

Then, the position of the proximal portions of the threaded rods $102_1$ and $102_2$ is adjusted as required by the installation in the respective sets of holes $188_1, 188_2$ and $188_3, 188_4$ to thereby adjust the position of the elongated bracket 103 about the distal portion 105 of the elongated member 101 (see arrows 117 of FIG. 4). And the nuts $108_1$, $108_2$, $108_3$ and $108_4$ are then displaced on the threaded rods $102_1$ and $102_2$ as required and then tightened to firmly secure the threaded rods $102_1$ and $102_2$ in this position of the distal portion 105 of the elongated member 101. The free proximal end portions of the rods $102_1$ and $102_2$ can be cut if desired.

The elongated member 101 is then positioned in the required angular position about the longitudinal axis 14, whereby the nut-and-washer assembly can then be tightened on the threaded rod portion 107 to fixedly secure the proximal end 104 of the elongated member 101 to the frame 201 of the tractor truck 116.

Of course, the sequence of the above operations for installing the fender 112 by means of the device 100 for attaching a fender to a vehicle can vary depending on the requirements, difficulty and particularities of a specific situation, and also according to the preferences of the person responsible for the installation.

Figure 1:
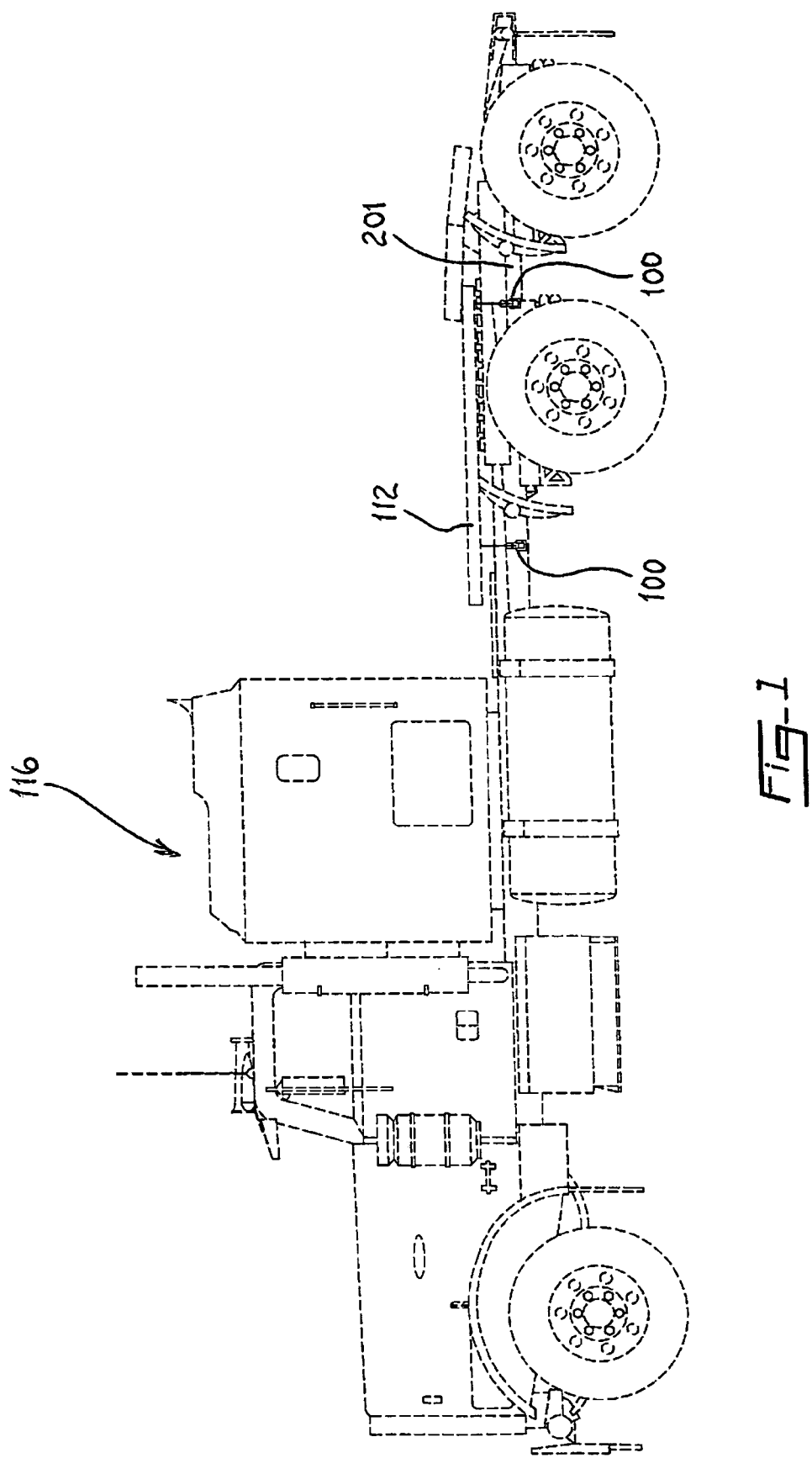
FIG. 1 is a side elevational view of a tractor truck equipped with fender attaching devices according to an illustrative embodiment of the present invention.

FIG. 1 illustrates a fender 112 installed on a tractor truck 116 by means of two device 100 according to the present invention for attaching a fender to a vehicle Although the present invention has been described hereinabove by way of an non-restrictive, illustrative embodiment thereof, this embodiment can be modified at will, within the scope of the appended claims, without departing from the spirit and nature of the subject invention. Even though the illustrative embodiment is described in relation to a tractor truck, it will be obvious to those of ordinary skill in the art that the subject invention can be used with other types of vehicles.

What is claimed is:

1. A device for attaching a fender to a vehicle, comprising:
   an elongated member having a proximal end and a distal portion, said proximal end being configured to be attached to the vehicle; and
   a fender fixation member mounted to the distal portion of the elongated member, said fender fixation member comprising a bracket for fixation to the fender of the vehicle, and a distance adjusting mechanism interposed between the distal portion of the elongated member and the fender fixation member; said bracket being adjustable relative to a direction parallel to a longitudinal axis of the distal portion of the elongated member.

2. The device as recited in claim 1, wherein said distance adjusting mechanism comprises at least one rod.

3. The device as recited in claim 2, wherein said at least one rod comprises a plurality of rods.

4. The device as recited in claim 2, wherein said at least one rod is threaded.

5. The device as recited in claim 2, wherein said at least one rod is perpendicular to both said distal portion of the elongated member and said bracket.

6. The device as recited in claim 2, wherein said at least one rod comprises a distal end fixed to said bracket and a proximal portion perpendicularly adjustable relative to the distal portion of the elongated member.

7. The device as recited in claim 6, wherein:
   said at least one rod is threaded;
   said distal portion of the elongated member has a hole through which the proximal portion of said at least one rod extends; and said at least one rod is perpendicularly adjusted relative to, and secured by means of a pair of nuts respectively positioned on opposite sides of, said distal portion of the elongated member.

8. The device as recited in claim 6, wherein said bracket comprises at least one slot through which the distal end of said at least one rod extends whereby the position of the bracket can be adjusted by sliding said at least one rod in said at least one slot.

9. The device as recited in claim 8, wherein said at least one rod comprises a plurality of rods, and wherein the bracket is elongated and comprises a series of coaxial slots through which a plurality of rods extend, respectively.

10. The device as recited in claim 8, wherein said at least one rod is threaded, the distal end of said at least one rod comprises a head on one side of the bracket, and the distal end of said at least one rod is attached to said bracket by means of a nut screwed on said at least one threaded rod on the side of said bracket opposite to said head.

11. The device as recited in claim 1, wherein the position of said fender fixation member is adjustable in a direction generally parallel to a longitudinal axis of the distal portion of the elongated member.

12. The device as recited in claim 1, wherein said proximal end of the elongated member comprises a fastener for fixation of said elongated member to the vehicle.

13. The device as recited in claim 12, wherein said fastener comprises a threaded member.

14. The device as recited in claim 12, wherein the fastener defines a pivot for rotating the proximal end of the elongated member about a longitudinal axis of the proximal end of said elongated member in order to allow positional adjustment of said elongated member about the vehicle at a plurality of angular positions about said longitudinal axis of the proximal end of the elongated member.

15. The device as recited in claim 12, wherein said fastener comprises a threaded rod parallel to a longitudinal axis of the proximal end of the elongated member.

16. The device as recited in claim 1, wherein the elongated member comprises a curvature between the proximal end and the distal portion.

17. A device for attaching a fender to a vehicle, comprising:
an elongated member having a proximal end and a distal portion, said proximal end being configured to be attached to the vehicle; and
a fender fixation member mounted to the distal portion of the elongated member, said fender fixation member comprising a bracket for fixation to the fender of the vehicle, and a distance adjustment mechanism interposed between the distal portion of the elongated member and the fender fixation member, said distance adjustment mechanism comprising at least one threaded rod.

18. A device for attaching a fender to a vehicle, comprising:
an elongated member having a proximal end and a distal portion, said proximal end being configured to be attached to the vehicle; and
a fender fixation member mounted to the distal portion of the elongated member, said fender fixation member comprising a bracket for fixation to the fender of the vehicle, and a distance adjustment mechanism interposed between the distal portion of the elongated member and the fender fixation member, said distance adjustment mechanism comprising at least one rod substantially perpendicular to both said distal portion of the elongated member and said bracket.

19. A device for attaching a fender to a vehicle, comprising:
an elongated member having a proximal end and a distal portion, said proximal end being configured to be attached to the vehicle; and
a fender fixation member mounted to the distal portion of the elongated member, said fender fixation member comprising a bracket for fixation to the fender of the vehicle, and a distance adjustment mechanism interposed between the distal portion of the elongated member and the fender fixation member; said distance adjustment mechanism comprising at least one rod having a distal end fixed to said bracket and a proximal portion perpendicularly adjustable relative to the distal portion of the elongated member.

20. The device as recited in 19:
said at least one rod being threaded;
said distal portion of the elongated member having a hole through which the proximal portion of said at least one rod extends; and
said at least one rod being perpendicularly adjusted relative to, and secured by means of a pair of nuts respectively positioned on opposite sides of, said distal portion of the elongated member.

* * * * *